United States Patent
Chow et al.

(10) Patent No.: US 11,010,815 B1
(45) Date of Patent: May 18, 2021

(54) SYSTEMS AND METHODS FOR VEHICLE RECOMMENDATIONS BASED ON USER GESTURES

(71) Applicant: Capital One Services, LLC, McLean, VA (US)

(72) Inventors: Chih-Hsiang Chow, Plano, TX (US); Steven Dang, Plano, TX (US); Elizabeth Furlan, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/745,960

(22) Filed: Jan. 17, 2020

(51) Int. Cl.
 *G06Q 30/06* (2012.01)
 *G06K 9/00* (2006.01)
 *G06F 3/01* (2006.01)

(52) U.S. Cl.
 CPC ......... *G06Q 30/0631* (2013.01); *G06F 3/017* (2013.01); *G06K 9/00335* (2013.01); *G06Q 30/0629* (2013.01); *G06Q 30/0643* (2013.01)

(58) Field of Classification Search
 CPC . G06Q 30/0601–0645; G06Q 30/0629; G06Q 30/0631; G06Q 30/0643; G06F 3/017; G06K 9/00335
 USPC ............................... 705/26.1–27.2
 See application file for complete search history.

(56) References Cited

U.S. PATENT DOCUMENTS

| | | | |
|---|---|---|---|
| 8,718,369 B1 * | 5/2014 | Tompkins .......... | G06Q 30/0623 382/181 |
| 2013/0144711 A1 | 6/2013 | Roundtree et al. | |
| 2013/0167085 A1 | 6/2013 | Roundtree et al. | |
| 2014/0157209 A1 | 6/2014 | Dalal et al. | |
| 2014/0195331 A1 * | 7/2014 | Takami .............. | G06Q 30/0631 705/14.41 |

(Continued)

FOREIGN PATENT DOCUMENTS

EP   1667444 B1   11/2017

OTHER PUBLICATIONS

Banerjee, Amartya. "AutoPoint: Selecting and Interacting with Distant Objects while Traveling in an Automobile." Order No. 10980643 Northwestern University, 2018. Ann Arbor: ProQuest. Web. Jan. 12, 2021. (Year: 2018).*

(Continued)

*Primary Examiner* — Resha Desai
*Assistant Examiner* — Kennedy Gibson-Wynn
(74) *Attorney, Agent, or Firm* — Bookoff McAndrews, PLLC

(57) ABSTRACT

According to certain aspects of the disclosure, a computer-implemented method may be used for providing a vehicle recommendation based on user gestures. The method may include displaying at least one image of a vehicle to a user and receiving at least one gesture from the user performed on the at least one image of the vehicle. Additionally, the method may include assigning a value to the at least one gesture from the user and determining a feature of the vehicle based on the at least one gesture from the user. Additionally, the method may include receiving gesture information related to the at least one gesture and determining a vehicle preference of the user based on the value, the feature of the vehicle, and the gesture information. Additionally, the method may include identifying at least one available vehicle based on the vehicle preference of the user and displaying the at least one available vehicle to the user.

20 Claims, 6 Drawing Sheets

(56) References Cited

U.S. PATENT DOCUMENTS

2016/0364783 A1* 12/2016 Ramanuja .......... G06Q 30/0631
2017/0124624 A1*  5/2017 Agrawal ............ G06Q 30/0631
2017/0249671 A1*  8/2017 Dinh .................. G06Q 30/0269

OTHER PUBLICATIONS

Yeh, Ron Bing. "Designing Interactions that Combine Pen, Paper, and Computer." Order No. 3292434 Stanford University, 2008. Ann Arbor: ProQuest. Web. Jan. 12, 2021. (Year: 2008).*

* cited by examiner

SYSTEMS AND METHODS FOR VEHICLE RECOMMENDATIONS BASED ON USER GESTURES

TECHNICAL FIELD

Various embodiments of the present disclosure relate generally to providing purchase recommendations to users based on the user's preferences and/or the preferences of a population, and more specifically, to artificial intelligence-based purchase recommendations.

BACKGROUND

Consumers of relatively expensive items, such as cars, real estate, mattresses, boats, computers, etc., may conduct part or all of their shopping for such items online, via the Internet. In researching and completing such a purchase, a consumer may visit multiple websites in search of appropriate information. When a consumer searches for a vehicle, for example, the options may be very basic and depend on the consumer knowing specifically their preferences in pre-defined categories. For example, a consumer may view inventory information or perform other research regarding a purchase on multiple websites. However, current vehicle purchase websites rely on drop downs and hard filters with strict predefined categories. Thus, a user may be unable to find certain information on a particular website and/or may be unsure of where such information is located.

Furthermore, in vehicle purchases such as those described above, consumers may spend countless hours researching due to the current rigid search options relying only on specific predefined categories set by the manufactures, dealers, and websites. This process may cause frustration among the consumers and may lead to disengagement from the vehicle purchasing experience.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, non-transitory computer readable media, systems, and methods are disclosed for determining one or more vehicle recommendations. Each of the examples disclosed herein may include one or more of the features described in connection with any of the other disclosed examples.

In one example, a computer-implemented method may be used for providing a vehicle recommendation based on user gesture. The method may include displaying, by one or more processors, at least one image of a vehicle to a user; receiving, by the one or more processors, at least one gesture from the user performed on the at least one image of the vehicle; assigning, by the one or more processors, a value to the at least one gesture from the user; determining, by the one or more processors, a feature of the vehicle based on the at least one gesture from the user; receiving, by the one or more processors, gesture information related to the at least one gesture; determining, by the one or more processors, a vehicle preference of the user based on the value, the feature of the vehicle, and the gesture information; identifying, by the one or more processors, at least one available vehicle based on the vehicle preference of the user; and displaying, by the one or more processors, the at least one available vehicle to the user.

According to another aspect of the disclosure, a computer system for providing a vehicle recommendation based on user gesture may include a memory having processor-readable instructions stored therein; and at least one processor configured to access the memory and execute the processor-readable instructions, which when executed by the processor configures the processor to perform a plurality of functions. The functions may include: displaying at least one image of a vehicle to a user; receiving at least one gesture from the user performed on the at least one image of the vehicle; assigning a value to the at least one gesture from the user; determining a feature of the vehicle based on the at least one gesture from the user; receiving gesture information related to the at least one gesture; determining a vehicle preference of the user based on the value, the feature of the vehicle, and the gesture information; identifying at least one available vehicle based on the vehicle preference of the user; and displaying the at least one available vehicle to the user.

In another aspect of the disclosure, a computer-implemented method for providing a vehicle recommendation based on user gesture may include displaying, by one or more processors, at least one image of a vehicle to a user; receiving, by the one or more processors, at least one gesture from the user performed on the at least one image of the vehicle; assigning, by the one or more processors, a value to the at least one gesture from the user; determining, by the one or more processors, at least one feature of the vehicle based on the at least one gesture from the user; generating, by the one or more processors, a matrix containing the value, the at least one feature of the vehicle, and identification information of the at least one image; determining, by the one or more processors, for each of the at least one feature of the vehicle, a quantity of total gestures from the user and a summation of the value assigned to the at least one gesture; determining, by the one or more processors, a ranking of vehicle preferences of the user based on the quantity of total gestures and the summation of the value assigned to the at least one gesture; identifying, by the one or more processors, at least one available vehicle based on the ranking of vehicle preferences of the user; and displaying, by the one or more processors, the at least one available vehicle to the user.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
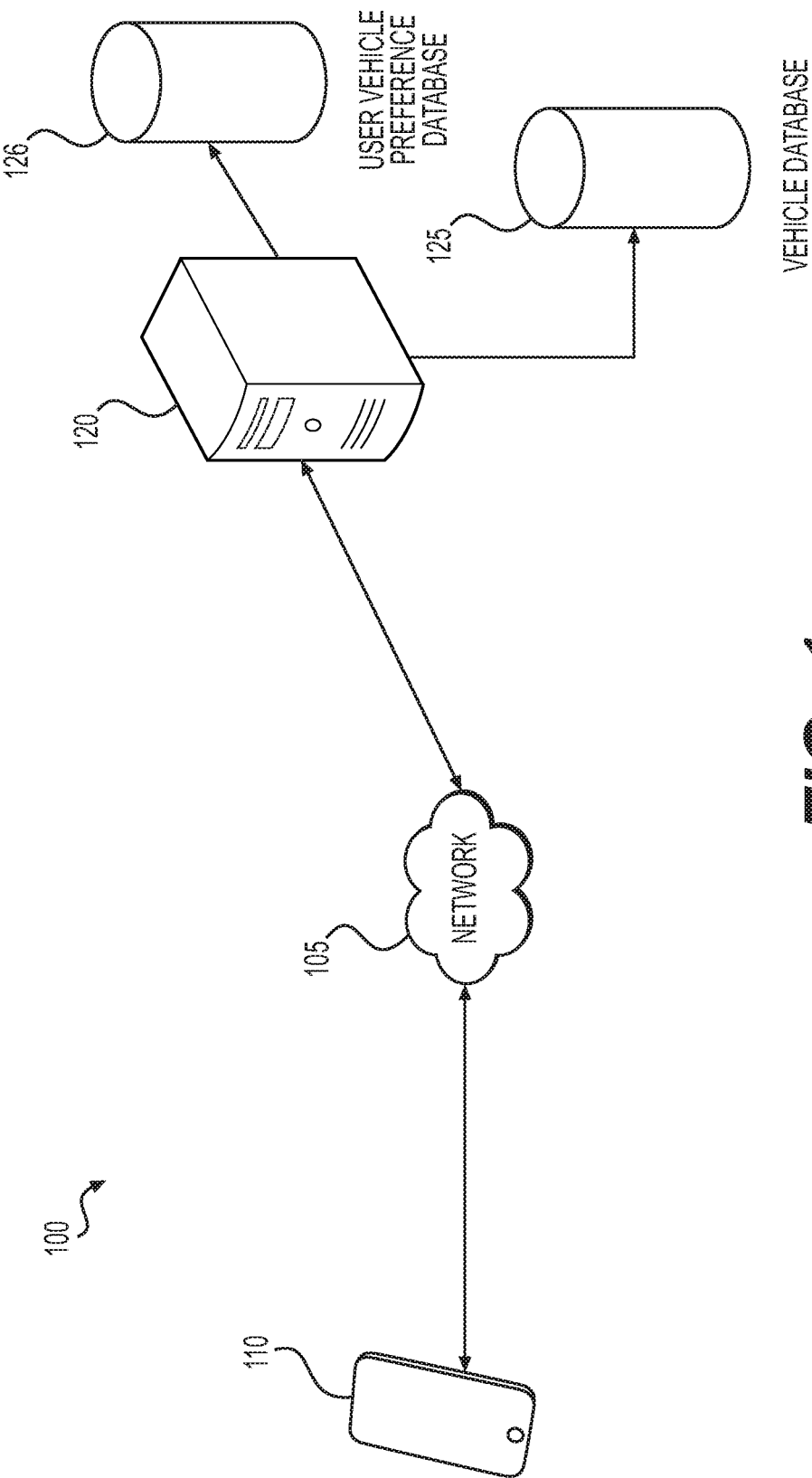
FIG. 1 depicts an exemplary environment in which systems, methods and other aspects of the present disclosure may be implemented.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompany drawings. Various embodiments of the present disclosure relate generally to methods and systems for providing a vehicle recommendation based on consumer gestures on vehicle images. For example, various embodiments of the present disclosure relate to displaying vehicle images to a consumer and determining a vehicular preference of the user based on the gestures performed by the consumer on the images.

As described above, consumers may be limited to certain predefined categories (e.g., hard filters) when searching for a vehicle even if they already have preferences on a specific style or available features. For consumers at the beginning stages of research (e.g., those uncertain of which preferences, make, model, features, etc. they may be interested in,) such predefined categories (e.g., hard filters) may be even more difficult to navigate. Therefore, a need exists to assist consumers in searching for and researching vehicles. The vehicle recommendation systems and methods of the present disclosure may allow the consumer to indicate specific preferences based on their interactions with images of vehicles to learn the consumer preferences and select available vehicles that best match the consumer preference.

Referring now to the appended drawings, FIG. 1 shows an exemplary environment 100 in which systems, methods, and other aspects of the present disclosure may be implemented. Environment 100 may include a user device 110 operated by a user (not shown), a vehicle recommendation server 120, a vehicle database 125, and a user vehicle preference database 126.

The vehicle database 125 may contain data related to vehicles that are available for purchase (e.g., vehicles that are actively listed for sale by one or more merchants, dealers, websites, vehicle aggregator services, ads, etc.). For example, vehicle database 125 may include the make, model, color, year, and options/features of available vehicles. Vehicle database 125 may also include images of the available vehicles. The images may be sorted (e.g., ordered) in a predetermined sequence (e.g., right side profile of vehicle, front of the vehicle, rear of the vehicle, left side profile of vehicle).

The user vehicle preference database 126 may contain data related to vehicle preferences of the user. For example, user vehicle preference database 126 may include user vehicle preferences and user gesture data. User vehicle preferences may include the user's preference on various vehicle attributes (e.g., wheel pattern and color, tire dimensions, vehicle shape and color, vehicle brand and logo, door handle shape and features, door type and shape, window shape and features, rear windshield shape and features, light shape and features, bumper shape and features, etc.). Other vehicle attributes, while not mentioned explicitly, may also be included based on the user preferences. Gesture data may include information related to one or more gestures performed by a user on one or more vehicle images. Gesture data may include the type of gesture, the velocity of gestures performed, the pressure of gestures performed, any repetition of gestures, order of gestures performed, speed of gestures performed, coordinates of the gestures on the image, and the image name.

The user device 110 and the vehicle recommendation server 120 may be connected via network 105. Network 105 may be any suitable network or combination of networks and may support any appropriate protocol suitable for communication of data between various components in the system environment 100. The network 105 may include a public network (e.g., the Internet), a private network (e.g., a network within an organization), or a combination of public and/or private networks.

The user device 110 may be operated by one or more users to perform purchases and transactions at an online environment. Examples of user device 110 may include smartphones, wearable computing devices, tablet computers, laptops, desktop computers, and vehicle computer systems.

Environment 100 may include one or more computer systems configured to gather, process, transmit, and/or receive data. In general, whenever environment 100 is described as performing an operation of gathering, processing, transmitting, or receiving data, it is understood that such operation may be performed by a computer system thereof. In general, a computer system may include one or more computing devices, as described in connection with FIG. 6 below.

Figure 2:
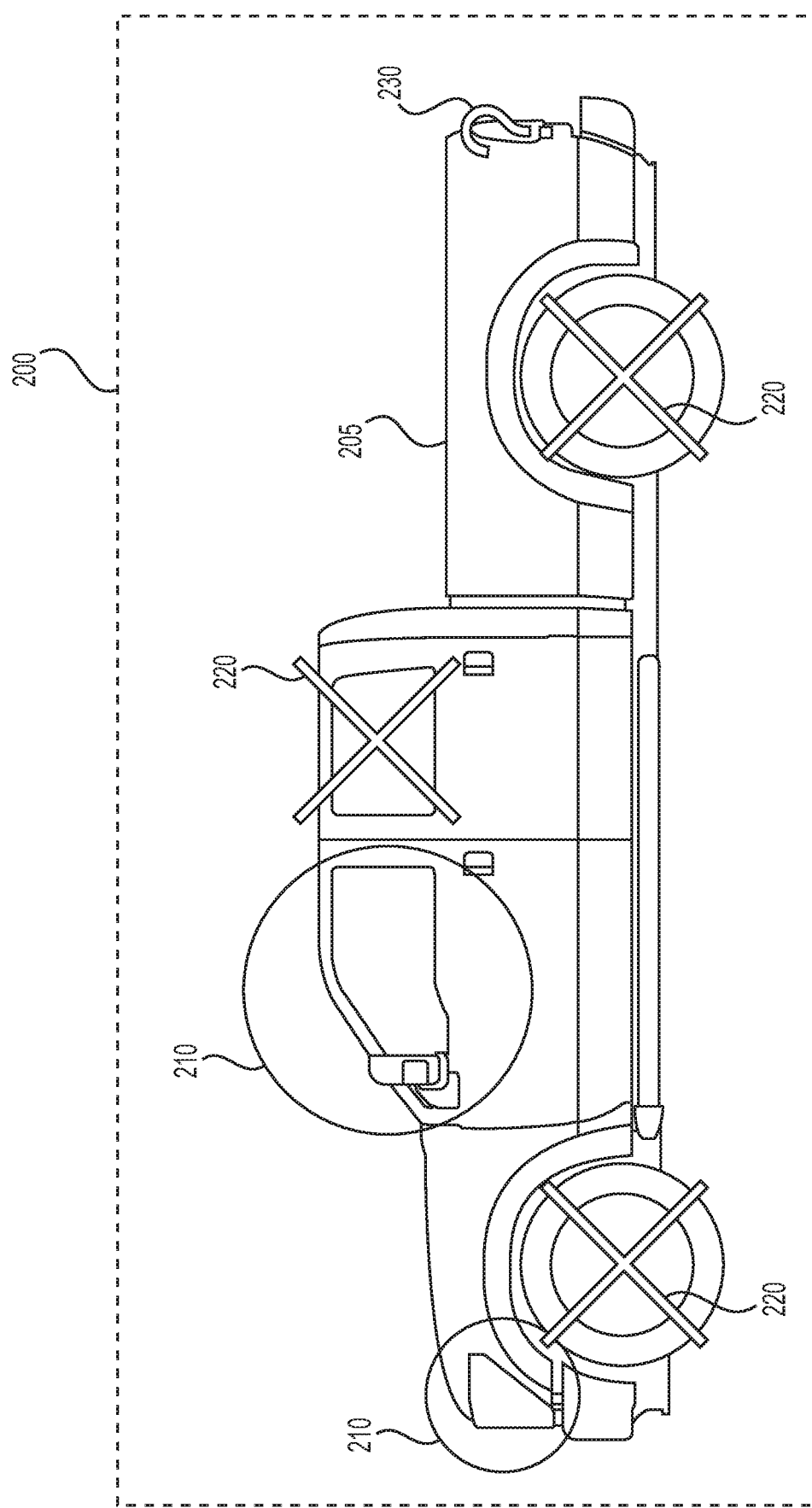
FIG. 2 depicts an exemplary interface for performing gestures on vehicle images, according to one aspect of the present disclosure.

FIG. 2 depicts an exemplary interface 200 for performing gestures on vehicle images, according to one aspect of the present disclosure. The exemplary interface 200 may be displayed via a display of user device 110, and may include an image of a vehicle 205. Further, the user may interact with the image of vehicle 205 to indicate their preferences, via interface 200. For example, the user may perform one or more circle gestures 210, for instance, circling the headlight of the vehicle and the front window of the vehicle as shown in FIG. 2. The user may also perform one or more cross gestures 220, for example, marking an "X" over the wheels of the vehicle and the rear window of the vehicle. Additionally, the user may perform a question mark gesture 230, marking the rear taillight of the vehicle with a "?". In the present disclosure, a circle gesture 210 may indicate that the user likes or prefers the feature(s) displayed in the circled area, an "X" gesture 220 may indicate that the user dislikes or does not prefer the feature(s) displayed in the marked area, and a "?" gesture 230 may indicate that the user neither likes/prefers or dislikes/does not prefer (e.g., is indifferent) the marked area. Therefore, in the example image of vehicle 205 of FIG. 2, the user may indicate that the user likes the displayed headlight and the displayed front window, dislikes the displayed wheels and the displayed rear window, and is unsure or neither likes or dislikes (e.g., is indifferent toward) the displayed taillight. While the gestures discussed above include circle, "X", and "?" for like/prefer, dislike/doesn't prefer, or indifferent, respectively, any other gestures or shapes may be used to indicate like/prefer, dislike/doesn't prefer, or indifference. For example, a user may be permitted to draw or mark a number indicative of a preference (e.g., a number "1" for prefers and a number "−1" for doesn't prefer, or an increasing number value to indicate an increasing degree of preference). Additionally, while three response options are depicted in FIG. 2, in other arrangements, greater or fewer response options may be available. For example, a user may be provided with five options to denote a scale of preference information including dislike (e.g., "1"), somewhat dislike (e.g., "2"), indifferent (e.g., "3"), somewhat like (e.g., "4"), and like (e.g., "5"). Regardless of the variety and quantity of the gestures, the gestures may be performed via an input device provided by, or operably coupled to, user device 110. Such input devices may include a touch screen, a mouse, and/or a keyboard.

Figure 3:
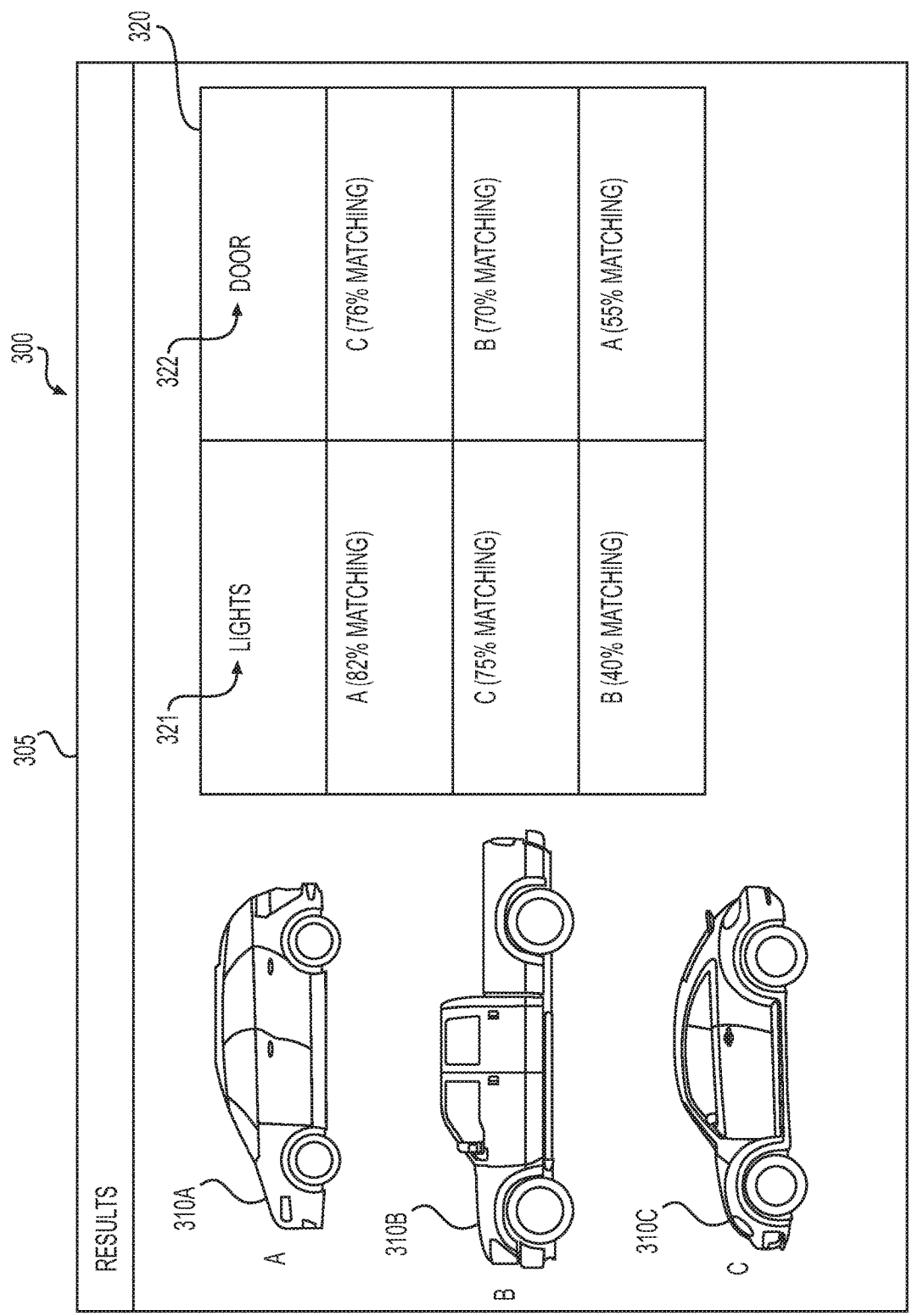
FIG. 3 depicts an exemplary interface for displaying recommendation results, according to one aspect of the present disclosure.

FIG. 3 depicts an exemplary interface 300 for displaying recommendation results, according to one aspect of the present disclosure. Interface 300 may include results page 305. The results page 305 may be a web page displayed via a web browser residing on the user device 110. The results page 305 may also be an e-mail displayed by an application residing on the user device 110. The results page 305 may include available vehicles 310A, 310B, and 310C, and features chart 320. The features chart 320 may include features of a vehicle that the user has performed gestures on to indicate preference. For example, features chart 320 may include lights 321 and door 322 as features of a vehicle that the user has indicated a preference towards. Features chart 320 may display how the features of the corresponding available vehicles 310A-310C correspond to the preferences of the user. For example, the lights of vehicle A are an 82% match to the vehicle lights preference of the user, and the door of vehicle C is a 76% match to the vehicle door preference of the user. Features chart 320 may further display that the lights of vehicle C are a 75% match to the vehicle lights preference of the user, and the door of vehicle B is a 70% match to the vehicle door preference of the user, and the lights of vehicle B are a 40% match to the vehicle lights preference of the user, and the door of vehicle A is a 55% match to the vehicle door preference of the user. In the example shown in FIG. 3, a higher percentage match to the vehicle feature preference of the user for a specific feature may indicate that the vehicle is similar to the preferred vehicle of the user. Additionally, a lower percentage match to the vehicle feature preference of the user for a specific feature may indicate that the vehicle is less similar to the preferred vehicle of the user.

The user may review the results page 305 and the features chart 320 to help inform their decision as to which vehicles most closely align with the user's preference. The results page 305 may also include user interactive areas for available vehicles 310A-310C such that the user may interact with an available vehicle (e.g., click or touch an available vehicle 310A-310C) and the user may be directed to the merchant that has the available vehicle for purchase, may be presented with contact information of the merchant, and/or may initiate a telephone call, a chat session, and/or e-mail communication with the merchant.

Figure 4:
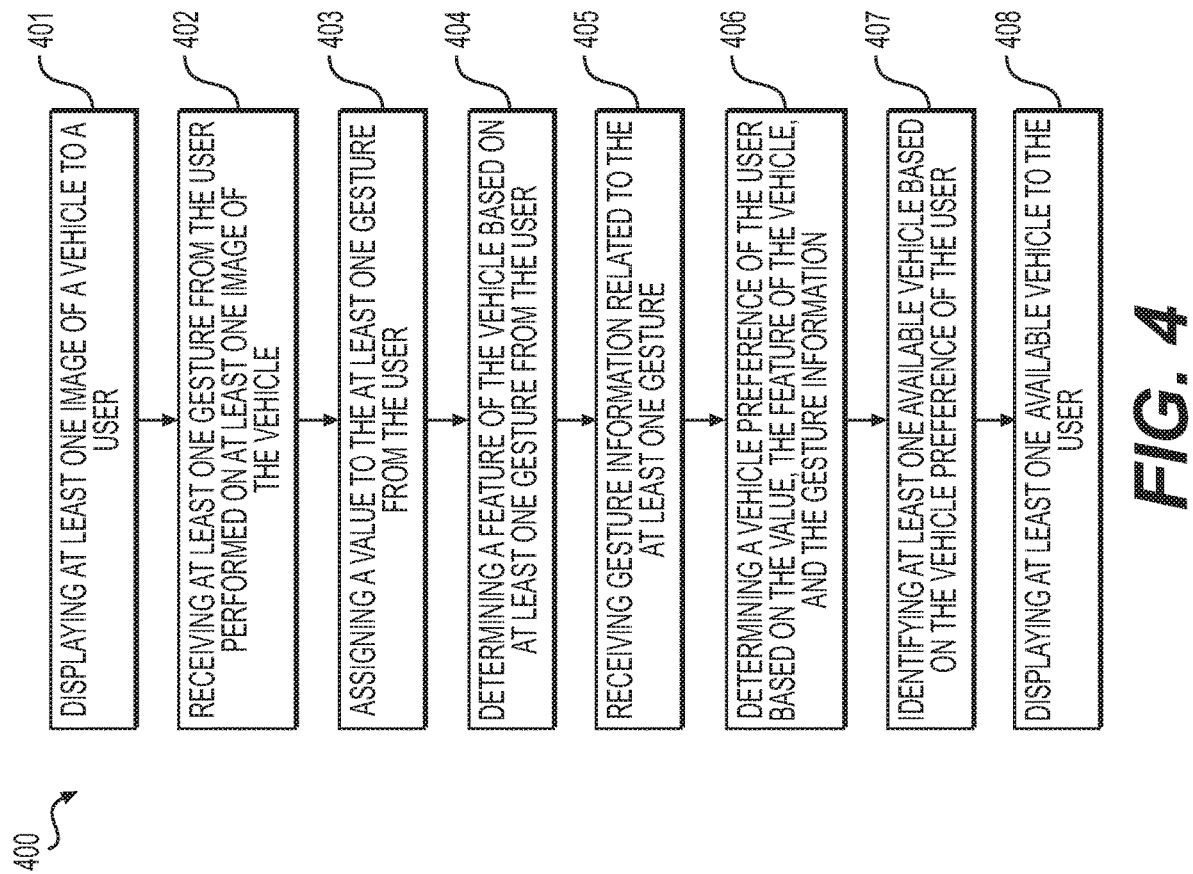
FIG. 4 depicts an exemplary flow diagram of a method of providing a vehicle recommendation based on user gestures on vehicle images, according to aspects of the present disclosure.

FIG. 4 depicts an exemplary flow diagram 400 of a method of providing a vehicle recommendation based on user gestures on vehicle images, according to one aspect of the present disclosure. The flow diagram 400 may begin with step 401 where at least one image of a vehicle is displayed to a user. Such an image may be displayed via a display of user device 110, as noted above. At step 402 gestures performed by the user on the image of the vehicle may be received, and at step 403 a value may be assigned to the at least one gesture from the user. For example, if the user likes a feature of the vehicle, the user may draw a circle around the feature. Then, in accordance with step 403, the feature may be assigned a value of "1", indicating a positive preference. If the user dislikes a feature of the vehicle, the user may draw a "X" over the feature. Then, in accordance with step 403, the feature may be assigned a value of "−1", indicating a negative preference. Further, if the user is unsure or neither likes or dislikes (e.g., is indifferent toward) a feature, the user may draw a "?" over the feature. Next, in accordance with step 403, the feature may be assigned a value of "0.5". Upon assigning a value to the at least one gesture, the feature of the vehicle may be determined based on the gesture at step 404. For example, if the user draws a gesture around/over the headlight of the vehicle in the image, then based on the location of the gesture, it may be determined that the user performed a gesture on the headlight and the preference of the user is determined based on the gesture (e.g., prefer the shape of the headlight if a circle is drawn, or dislike the shape of the headlight if an "X" is drawn, etc.). While the gestures circle, "X" and "?" are discussed with regards to the current disclosure, any other gestures may also be used for users to indicate his/her preference, as noted above.

At step 405, gesture information related to at least one gesture may also be received. Gesture information may include the velocity of the gesture, pressure of the gesture, repetition of the gesture, order of the gesture, speed of the gesture, coordinates of the gestures on the image, and the image name. Gesture information may further indicate preference of the user of a particular feature of the vehicle. For example, if a user exerts a lot of pressure when performing a circle gesture around a feature it may indicate that the feature is important to the user and a weight may be applied to the feature to indicate the importance. Because gestures may be performed via an input device such as a mouse, or via touch, the gesture information may also include mouse or touch location of the gestures and the coordinates of the inputs.

At step 406, the vehicle preference of the user may be determined based on the value of the gestures, the features of the vehicle, gesture information, and vehicle information. The features of the vehicle may be determined based on the coordinates of the gestures performed on the image of the vehicle, as discussed above according to step 405. Vehicle information may include an image of the vehicle, the make, model, year and trim of the vehicle, and the angles of the vehicle in the images (e.g., front of the vehicle, side of the vehicle, rear of the vehicle, etc.). The vehicle preference of the user may be determined using a machine learning algorithm such as a convolutional neural network (CNN). While CNN is discussed throughout the present disclosure, it is used as an exemplary algorithm, and any other machine learning algorithms may also or alternatively be used. The CNN may receive as inputs the gesture, the gesture location and size, gesture coordinates, the vehicle information, and a time stamp, and may then analyze visual imagery to determine the features of the vehicle and the corresponding value. For example, the vehicle image 205 depicted in FIG. 2 may be input into the CNN for identification analysis. The output of the analysis may be [Headlight, 1], [Drive Window, 1], [Wheels, −1], [Rear Window. −1], [Taillight, 0.5], [Year, Made, Model], [Side View]. The identification analysis may be performed by the CNN for each image of a vehicle that the user performs gestures on so as to acquire a variety of data to define the vehicle preference of the user.

After determining the vehicle preference(s) of the user, the vehicle preference(s) may be input into the CNN for similarity analysis to identify at least one available vehicle based on the vehicle preference(s) of the user at step 407. Indeed, the CNN may analyze the similarities and difference of all the vehicle features a user may have performed gestures on. For example, the user may have performed gestures on three different vehicle images, and indicated that the user likes the headlights on two of the vehicles but dislikes the headlights on the third vehicle. The CNN may perform visual imagery analysis to determine the similarities and differences between the headlights of the three vehicles. The CNN may then perform a comparison of the headlights of all available vehicles to the three headlights the user has indicated preferences on to select available vehicles that most closely match with the user preferred headlight. The CNN may perform this analysis with every feature the user has performed gestures on by comparison to corresponding features on all of the available vehicles. Upon identifying at least one available vehicle that matches or meets the preferences of the user (e.g., matches exactly or satisfies a predefined threshold of matching), the available vehicle(s) may then be presented to the user at step 408. The display of available vehicles may correspond to FIG. 3. For example, the display may be a web page displayed via a web browser residing on the user device 110. Additionally or alternatively, the display may be an e-mail displayed by an application residing on the user device 110.

Figure 5:
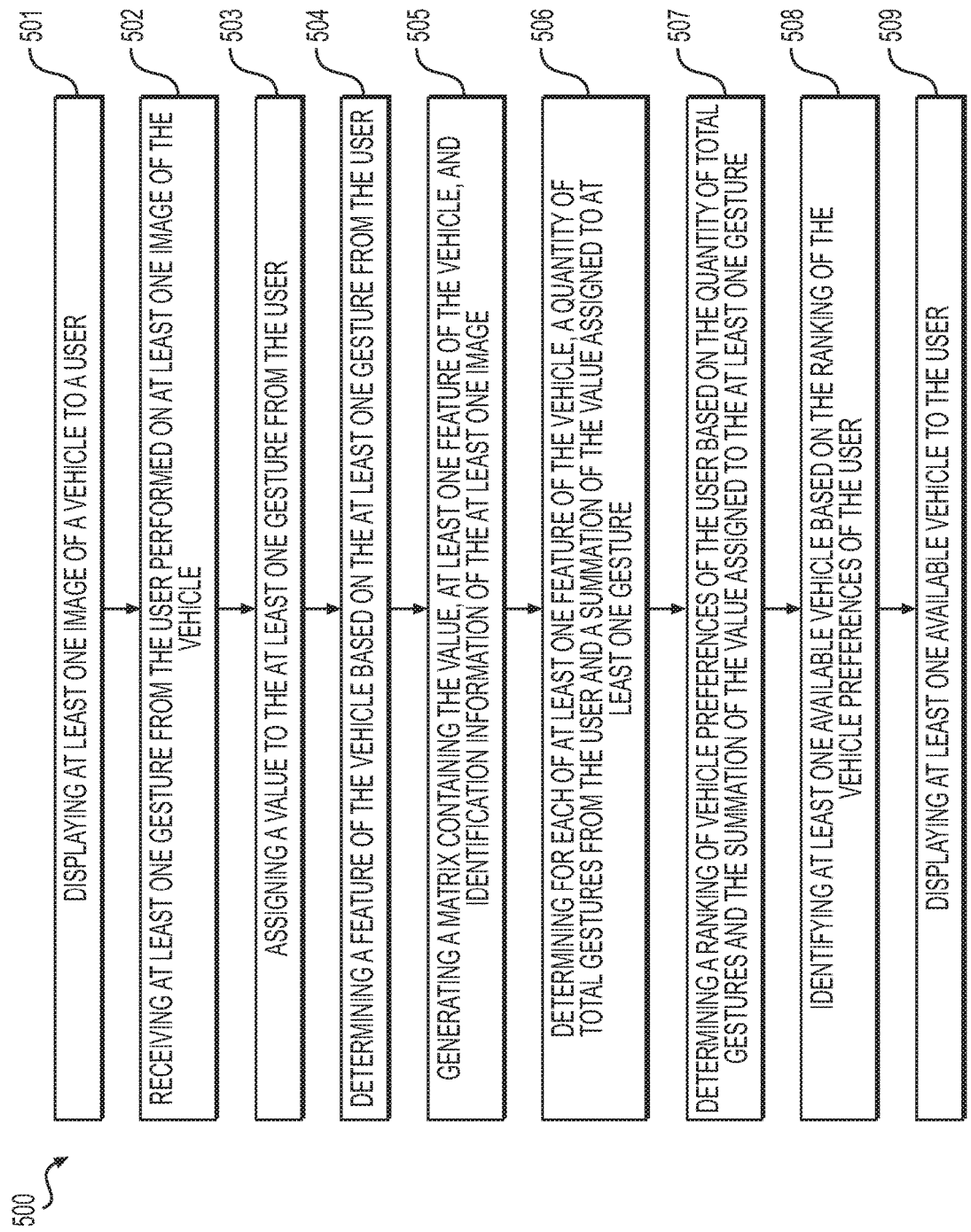
FIG. 5 depicts another exemplary flow diagram of an additional method of providing a vehicle recommendation based on user gestures on vehicle images, according to aspects of the present disclosure.

FIG. 5 depicts another exemplary flow diagram 500 of a method of providing a vehicle recommendation based on user gestures on vehicle images, according to one aspect of the present disclosure. The flow diagram 500 may begin with step 501 where at least one image of a vehicle is displayed to a user. For example, such an image may be displayed via a display of user device 110, as noted above. At step 502 gestures performed by the user on the image of the vehicle may be received, and at step 503, a value may be assigned to the at least one gesture from the user. For example, if the user likes a feature of the vehicle, the user may draw a circle around the feature and the feature may be assigned a value of "1", indicating a positive preference. If the user dislikes a feature of the vehicle, the user may draw an "X" over the feature and the feature may be assigned a value of "−1", indicating a negative preference. If the user is unsure or neither likes or dislikes a feature (e.g., is indifferent towards the feature), the user may draw a "?" over the feature and the feature may be assigned a value of "0.5". Upon assigning a value to the at least one gesture, the feature of the vehicle may be determined based on the gesture at step 504. For example, if the user draws a gesture around/over the headlight of the vehicle in the image, then based on the location of the gesture, it may be determined that the user performed a gesture on the headlight and the preference of the user is determined based on the gesture (e.g., prefer the shape of the headlight if a circle is drawn, or dislike the shape of the headlight if an "X" is drawn). While the gestures circle, "X" and "?" are discussed with regards to the current disclosure, any other gestures may also be used for users to indicate his/her preference, as discussed above.

At step 505, the identified features of the vehicles, which may also include gesture information determined in step 502, the corresponding value, and corresponding identification information of the images may be received and a matrix may be generated based on the information. An exemplary matrix is presented below:

Exemplary Matrix 1

|  | Vehicle 1 | Vehicle 2 | Vehicle 3 | Vehicle 4 | Vehicle N |
|---|---|---|---|---|---|
| Lights | 1 | −1 | 1 | .5 | 1 |
| Door | N | 1 | 1 | .5 | 1 |
| Window | N | N | −1 | N | N |

Exemplary matrix 1 may include the images of vehicles that the user performed gestures on (e.g., Vehicle 1-Vehicle N), the features of vehicles identified by the gestures (e.g., lights, door, window), and the value assigned to the features based on the gesture (e.g., the user performed a positive gesture on the lights of vehicle 1, but did not perform any gestures on the door or window of vehicle 1 as denoted by 'N'). At step 506 a determination may be made for each of the at least one feature of the vehicle, a quantity of total gestures from the user, and a summation of the value assigned to the at least one gesture. For example, as depicted by exemplary matrix 1, the user may have performed one or more gestures on images of five vehicles. With respect to the feature of lights, the user performed gestures on all five vehicles with a total value of 2.5 (2.5=1−1+1+0.5+1). With respect to the feature of the door, the user performed gestures on four of the five vehicles with a total value of 3.5 (3.5=1+1+0.5+1). With respect to the feature of the window, the user performed gestures on one of the five vehicles with a total value of −1. In the example of matrix 1, a value of 1 is assigned to gestures indicating a positive (e.g., like) preference (e.g., circle gestures), a value of 0.5 is assigned to gestures indicating an indifferent response (e.g., "?" gestures), and a value of −1 is assigned to gestures indicating a negative (e.g., dislike) response.

At step 507, a determination may be made on the ranking of vehicle preferences of the user based on the quantity of the total gestures and the summation of the value assigned to the at least one gesture. In the example discussed above with respect to exemplary matrix 1, the user may have a particular preference for lights of a vehicle because the user performed the most gestures on the lights (e.g., 5 total gestures), and may have the least particular preference on the window of a vehicle because the user performed the fewest gestures on the window (e.g., 1 total gesture). Therefore a ranking may be made to place the lights as the top vehicle preference of the user and place the window as the bottom vehicle preference of the user. As noted above, the vehicle preferences of the user may be identified via the CNN or other machine learning algorithm. The summation of values of each of the features (e.g., 2.5 for the lights and −1 for the window) may be used as a confidence value for the CNN to determine similarities when searching available vehicles.

At step 508, an identification process may be conducted to find at least one available vehicle based on the ranking of the vehicle preferences of the user. For example, as discussed above with reference to FIG. 4, after identifying the vehicle preference of the user, the CNN (or other machine learning algorithm) may perform similarity analysis to identify at least one available vehicle based on the vehicle preference(s) of the user. Upon identifying at least one available vehicle that matches or meets the preferences of the user (e.g., matches exactly or satisfies a predetermined matching threshold), the available vehicles may then be presented to the user at step 509. The display of available vehicles may correspond to FIG. 3 and may be listed according to the ranking of the vehicle preference of the user. For example, available vehicles with similar lights to the user vehicle light preference may be displayed first because the user may have indicated that the light is a more important preference than other features. The display may be a web page displayed via a web browser residing on the user device 110. The display may also or alternatively be an e-mail or displayed by an application residing on the user device 110.

Figure 6:
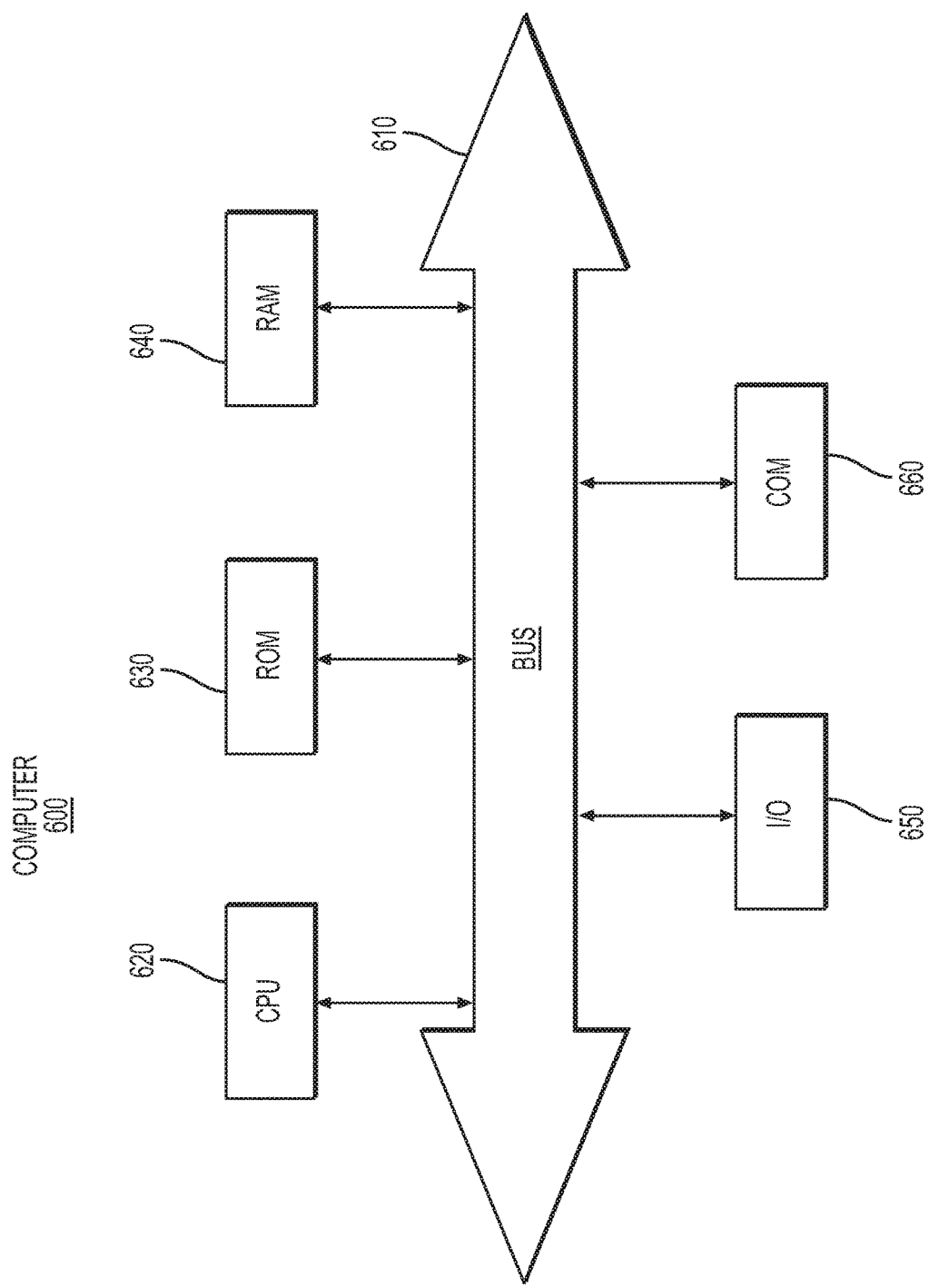
FIG. 6 depicts an exemplary computer device or system, in which embodiments of the present disclosure, or portions thereof, may be implemented.

FIG. 6 depicts a high-level functional block diagram of an exemplary computer device or system, in which embodiments of the present disclosure, or portions thereof, may be implemented, e.g., as computer-readable code. In some implementations, the user device 110 may correspond to device 600. Additionally, each of the exemplary computer servers, databases, user interfaces, modules, and methods described above with respect to FIGS. 1-5 can be implemented in/via device 600 using hardware, software, firmware, tangible computer readable media having instructions stored thereon, or a combination thereof, and may be implemented in one or more computer systems or other processing systems. Hardware, software, or any combination of such may implement each of the exemplary systems, user interfaces, and methods described above with respect to FIGS. 1-5.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-5, may be implemented using device 600. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 6, device 600 may include a central processing unit (CPU) 620. CPU 620 may be any type of processor device including, for example, any type of special purpose or a general-purpose microprocessor device. As will be appreciated by persons skilled in the relevant art, CPU 620 also may be a single processor in a multi-core/multi-processor system, such system operating alone, or in a cluster of computing devices operating in a cluster or server farm. CPU 620 may be connected to a data communication infrastructure 610, for example, a bus, message queue, network, or multi-core message-passing scheme.

Device 600 also may include a main memory 640, for example, random access memory (RAM), and also may include a secondary memory 630. Secondary memory 630, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 630 may include other similar means for allowing computer programs or other instructions to be loaded into device 600.

Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 600.

Device 600 also may include a communications interface ("COM") 660. Communications interface 660 allows software and data to be transferred between device 600 and external devices. Communications interface 660 may include a modem, a network interface (such as an Ethernet card), a communications port, a PCMCIA slot and card, or the like. Software and data transferred via communications interface 660 may be in the form of signals, which may be electronic, electromagnetic, optical, or other signals capable of being received by communications interface 660. These signals may be provided to communications interface 660 via a communications path of device 600, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for providing a vehicle recommendation based on user gesture, the method comprising:
    causing display of, by one or more processors, at least one image of a vehicle to a user;
    receiving, by the one or more processors, at least one gesture from the user performed on a portion of the at least one image of the vehicle, wherein the at least one gesture indicates one of a positive preference, a negative preference, or a neutral preference, and wherein the at least one gesture is associated with a marking;
    generating, by the one or more processors, a second image depicting the at least one image of a vehicle and a graphical depiction of the marking associated with the at least one gesture;
    assigning, by the one or more processors, a value to the at least one gesture from the user based on the indicated positive preference, negative preference, or neutral preference;
    determining, by the one or more processors, a feature of the vehicle based on the at least one gesture from the user;
    receiving, by the one or more processors, gesture information related to the at least one gesture;
    determining, by the one or more processors, a vehicle preference of the user based on the value, the feature of the vehicle, and the gesture information;
    identifying, by the one or more processors, at least one available vehicle based on the vehicle preference of the user; and
    causing display of, by the one or more processors, the at least one available vehicle to the user.

2. The computer-implemented method of claim 1, further including:
    before the causing display of the at least one available vehicle to the user, determining, by the one or more processors, a similarity level of the at least one available vehicle by comparing the at least one available vehicle to the vehicle preference of the user.

3. The computer-implemented method of claim 2, further including:
    determining whether the similarity level of the at least one available vehicle is equal to or exceeds a predetermined threshold; and
    when the determining determines that the similarity level of the at least one available vehicle is equal to or exceeds the predetermined threshold, the causing display includes causing display of the at least one available vehicle having the similarity level equal to or exceeding the predetermined threshold and an indicator of the similarity level.

4. The computer-implemented method of claim 3, further including:

ranking the display of the at least one available vehicle based on the indicator of the similarity level.

5. The computer-implemented method of claim 1, further including:
determining, by the one or more processors, for the feature of the vehicle, a quantity of total gestures received from the user and a summation of the respective values assigned to each gesture.

6. The computer-implemented method of claim 5, wherein the determining the vehicle preference of the user further includes determining the vehicle preference based on the quantity of total gestures received from the user and the summation of the respective values assigned to the each gesture.

7. The computer-implemented method of claim 6, further including:
ranking the vehicle preference based on the quantity of total gestures received from the user and the summation of the respective values assigned to each gesture.

8. The computer-implemented method of claim 1, wherein the feature of the vehicle is at least one of vehicle wheel, vehicle tire, vehicle shape, vehicle color, vehicle icons, vehicle door, vehicle door handle, vehicle window vehicle rear windshield, vehicle lights, or vehicle bumper.

9. The computer-implemented method of claim 1, wherein the gesture information includes at least one of type, velocity, pressure, repetition, order, or speed.

10. The computer-implemented method of claim 1, wherein the gesture is performed by at least one of touch, mouse, keyboard, or sensors.

11. A computer system for providing a vehicle recommendation based on user gesture, the computer system comprising:
a memory having processor-readable instructions stored therein; and
at least one processor configured to access the memory and execute the processor-readable instructions, which when executed by the processor configures the processor to perform a plurality of functions, including functions for:
causing display of at least one image of a vehicle to a user;
receiving at least one gesture from the user performed on a portion of the at least one image of the vehicle, wherein the at least one gesture indicates one of a positive preference, a negative preference, or a neutral preference, and wherein the at least one gesture is associated with a marking;
generating a second image depicting the at least one image of a vehicle and a graphical depiction of the marking associated with the at least one gesture;
assigning a value to the at least one gesture from the user based on the indicated positive preference, negative preference, or neutral preference;
determining a feature of the vehicle based on the at least one gesture from the user;
receiving gesture information related to the at least one gesture;
determining a vehicle preference of the user based on the value, the feature of the vehicle, and the gesture information;
identifying at least one available vehicle based on the vehicle preference of the user; and
causing display of the at least one available vehicle to the user.

12. The computer system of claim 11, wherein the functions further include:
before the causing display of the at least one available vehicle to the user, determining a similarity level of the at least one available vehicle by comparing the at least one available vehicle to the vehicle preference of the user.

13. The computer system of claim 12, wherein the functions further include:
determining whether the similarity level of the at least one available vehicle is equal to or exceeds a predetermined threshold; and
when the determining determines the that the similarity level of the at least one available vehicle is equal to or exceeds the predetermined threshold, the causing display includes causing display of the at least one available vehicle having the similarity level equal to or exceeding the predetermined threshold and an indicator of the similarity level.

14. The computer system of claim 13, wherein the functions further include:
ranking the display of the at least one available vehicle based on the indicator of the similarity level.

15. The computer system of claim 11, wherein the functions further include:
determining, for the feature of the vehicle, a quantity of total gestures received from the user and a summation of the respective values assigned to each gesture.

16. The computer system of claim 15, wherein the functions further include, in the determining the vehicle preference of the user, determining the vehicle preference based on the quantity of total gestures received from the user and the summation of the respective values assigned to each gesture.

17. The computer system of claim 11, wherein the feature of the vehicle is at least one of vehicle wheel, vehicle tire, vehicle shape, vehicle color, vehicle icons, vehicle door, vehicle door handle, vehicle window vehicle rear windshield, vehicle lights, or vehicle bumper.

18. The computer system of claim 11, wherein the gesture information includes at least one of type, velocity, pressure, repetition, order, or speed.

19. The computer system of claim 11, wherein the gesture is performed by at least one of touch, mouse, keyboard, or sensors.

20. A computer-implemented method for providing a vehicle recommendation based on user gesture, the method comprising:
causing display of, by one or more processors, at least one image of a vehicle to a user;
receiving, by the one or more processors, at least one gesture from the user performed on a portion of the at least one image of the vehicle wherein the at least one gesture indicates one of a positive preference, a negative preference, or a neutral preference, and wherein the at least one gesture is associated with a marking;
generating, by the one or more processors, a second image depicting the at least one image of a vehicle and a graphical depiction of the marking associated with the at least one gesture;
assigning, by the one or more processors, a value to the at least one gesture from the user based on the indicated positive preference, negative preference, or neutral preference;
determining, by the one or more processors, at least one feature of the vehicle based on the at least one gesture from the user;

generating, by the one or more processors, a matrix containing the value, the at least one feature of the vehicle, and identification information of the at least one image;

determining, by the one or more processors, for each of the at least one feature of the vehicle, a quantity of total gestures from the user and a summation of the value assigned to the at least one gesture;

determining, by the one or more processors, a ranking of vehicle preferences of the user based on the quantity of total gestures and the summation of the value assigned to the at least one gesture;

identifying, by the one or more processors, at least one available vehicle based on the ranking of vehicle preferences of the user; and causing display of, by the one or more processors, the at least one available vehicle to the user.

* * * * *